Feb. 1, 1955    C. T. MORROW    2,701,337
TIME CONSTANT METER FOR TUNING FORKS AND THE LIKE
Filed Aug. 17, 1951

INVENTOR
CHARLES T. MORROW
BY
Paul B. Hunter
ATTORNEY

United States Patent Office 2,701,337
Patented Feb. 1, 1955

2,701,337

TIME CONSTANT METER FOR TUNING FORKS AND THE LIKE

Charles T. Morrow, Great Neck, N. Y., assignor to The Sperry Corporation, a corporation of Delaware Application August 17, 1951, Serial No. 242,295

9 Claims. (Cl. 324—68)

This invention relates to a time constant meter, and more particularly, to a meter for measuring the time constant of tuning forks and other high Q devices.

Several methods have been developed for ascertaining the time constant and other related variables of a resonant system. In pure electrical oscillatory systems, for example, direct impedance measurements are generally satisfactory for determining such variables. In mechanical or acoustical systems various techniques have been employed for measurement or observation of a transient. For example, one such method is the use of a variable frequency oscillator in the measurement of the band width between the half power points as the driving frequency is varied, from which the Q of the resonant circuit, the time constant, and other factors of the oscillating system can be calculated. Where the transient decay is very long, it is possible to measure the time constant directly by observing the decay. However, this is likely to require complicated apparatus if the method is to be accurate.

Such prior art methods are open to one or more of the objections that they do not directly measure the time constant but require indirect measurements of other properties from which the time constant must be calculated. Such methods are frequently slow and involved. Also the equipment necessary for making such measurements is often complicated and difficult to use.

It is the general object of this invention to avoid and overcome the foregoing and other difficulties of and objections to the prior art practices by provision of a time constant meter which is less complicated, easier to use, more compact and accurate, and which can be used to measure any part of the decay curve.

Another object of this invention is to provide apparatus for obtaining a direct measurement of the time constant of a high Q device such as a tuning fork.

Another object of this invention is the provision of apparatus for directly measuring the time constant by electrical means without the necessity of additional manual computations.

These and other objects of the invention which will become apparent as the description proceeds are achieved by the provision of apparatus for measuring the time constant of a transient decaying alternating signal, such apparatus comprising a full wave rectifier for rectifying the alternating signal of the transient decay, a resistance-capacitance differentiating network, and a filter network connecting the output of the rectifier and the differentiating network. A calibrated potentiometer is connected across the output of the filter network, and the attenuated output of the potentiometer and the output of the differentiating network are connected across opposite ends of a voltage divider. A null balance indicator, such as a cathode ray tuning indicator or "tuning eye," is employed for indicating a continuous balance between the output of the differentiating network and the output of the potentiometer as the transient signal decays. The attenuator is calibrated to read directly in seconds the time constant of the measured system, a correct reading being shown when the attenuator is adjusted to provide a continuous null indication during substantially the entire time interval of the transient decay.

For a better understanding of the invention reference should be had to the accompanying drawings, wherein.

The principle on which the present invention is based can best be understood by reference to the general equation for a simple transient decay, which may be expressed as $$e = E\epsilon^{-\alpha t} = E\epsilon^{-\frac{t}{T}} \qquad (1)$$

where E is the initial amplitude expressed in terms of a voltage at time $t=0$, $\epsilon$ is the natural logarithm base, $\alpha$ is the damping constant, and T is the time constant. Differentiation of this envelope yields $$\frac{de}{dt} = -\alpha E\epsilon^{-\alpha t} = -\frac{1}{T} E\epsilon^{-\frac{t}{T}} \qquad (2)$$

It is evident that Equation 2, the derivative of Equation 1, is equivalent to Equation 1 except for the factor of $-\alpha$ or its equivalent $$-\frac{1}{T}$$

Thus, if the voltage $e$ of Equation 1 is attenuated by a factor $\alpha$ and added to the voltage signal of Equation 2, the equal and opposite signals produce a null balance condition. By providing a calibrated attenuator which may be made to read directly in units of $\alpha$ or T, direct measurements of these quantities by adjustment to a null, as in a bridge balance, can be effected.

Figure 1:
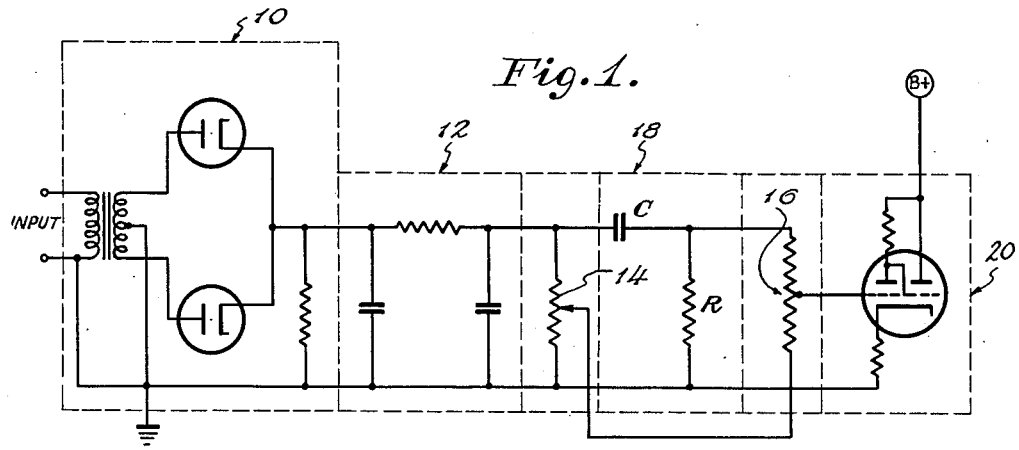
Fig. 1 is a schematic wiring diagram showing a preferred embodiment of the invention.

With specific reference to the form of the invention illustrated in Figure 1, the numeral 10 indicates generally a full wave rectifier, the input signal of which is derived from the oscillating system to be measured. If such be a tuning fork, for example, any suitable electrical pickup may be employed which generates an alternating voltage signal proportional to the amplitude of the tuning fork and having the same frequency. Such voltage signal may be suitably amplified and applied to the rectifier 10. The rectifier is of the conventional full wave type, the output of which is applied to a filter circuit indicated generally at 12. The output of the filter circuit 12 is substantially proportional to the rectified envelope of the transient-decay alternating signal as derived from the tuning fork.

In accordance with the principles discussed above, the rectified envelope is attenuated by means of a calibrated potentiometer 14 and applied to one end of a voltage divider or mixing circuit 16. The rectified envelope derived from the filter circuit 12 is also applied to a differentiating circuit indicated generally at 18, the differentiated signal being applied to the other end of the voltage divider 16.

The differentiating circuit is a conventional resistance-capacitance network in which the input signal is applied across the resistance and capacitance in series, and the differential signal is developed across the resistance. The output signal of the differentiating circuit 18 is opposite in polarity from the input signal, so that by proper adjustment of the potentiometer 14, the signals applied to the opposite ends of the voltage divider 16 will be equal and opposite in magnitude. Any suitable indicating means, such as a conventional cathode ray tuning indicator 6E5 tube, may be used to indicate when a balance condition is effected. Such a circuit is indicated at 20, the control grid of the 6E5 being connected to the midpoint of the voltage divider 16. While a tuning eye has been specifically illustrated and described as a preferred means, it is to be understood that other null balance indicating means, as for example a cathode ray oscilloscope or galvanometer may be used. It will be recognized that when the attenuator is properly set, the midpoint of the divider 16 will be at ground potential, so that the tuning eye 20, or galvanometer for example, will give a null reading.

Figure 3:
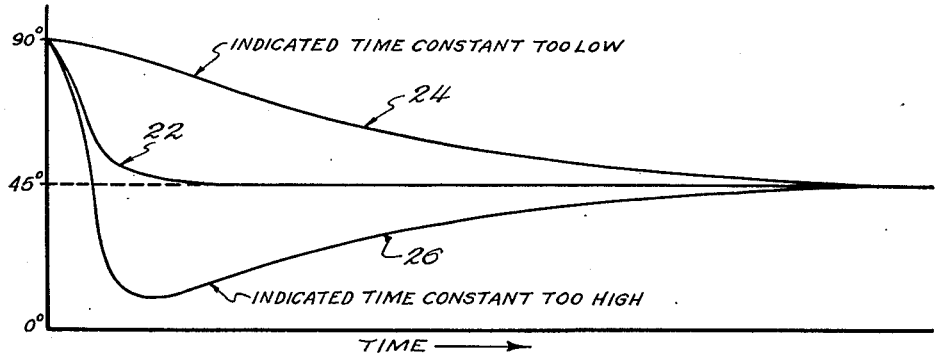
Fig. 3 is a graphical representation of the change in the angle of the tuning eye for various settings of the calibrated attenuator. A null balance indication is represented by the intermediate line where the angle of the eye remains constant at approximately 45° during substantially the entire period.

By reference to Figure 3, it will be noted that the angle of the tuning eye, when the potentiometer 14 is correctly set to match the decay signal derived from the tuning fork, very quickly drops to an angle of approximately 45°, as indicated by the graphical curve 22, and continues to maintain that condition throughout the time of the transient oscillation of the tuning fork, this being the angle of the tuning eye with the grid at ground potential. If the potentiometer 14 is incorrectly adjusted so that the instantaneous amplitude of the attenuated signal is continuously greater than or less than the differentiated signal, the angle of the tuning eye will approach 45° at a relatively slow rate from either a greater or a lesser angle, depending on the setting of the potentiometer 14. See curves 24 and 26 in Figure 3. It is a simple matter to adjust the potentiometer 14 to obtain a balance condition, so that a direct reading measurement can be made from the calibrated dial of the potentiometer.

Figure 2:
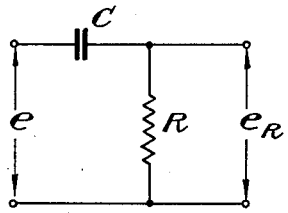
Fig. 2 is a schematic diagram of the differentiating network.

To calibrate the potentiometer, it is necessary to relate the time constant under measurement to the resistance and capacitance of the differentiating circuit 18. The relationship between the time constant of the system under measurement and the RC product of the differentiating circuit can best be understood by reference to Figure 2, in which the input voltage $e$ is derived from the rectified envelope of the transient decay, as expressed in Equation 1. This voltage is equal to the sum of the voltage drops across the capacitance C and the resistance R and may be expressed in equation form as:

$$e_R + \frac{1}{C}\int \frac{e_R}{R} dt = E_0 \epsilon^{-\alpha t} \qquad (3)$$

or $$\frac{de}{dt} R + \frac{1}{CR} e_R = -\alpha E_0 \epsilon^{-\alpha t}$$

where $E_0$ is the initial amplitude of the voltage across the input of the differentiating network. The voltage across R, or the differentiated output signal may be expressed as $$e_R = E_R \epsilon^{-\alpha t} \qquad (4)$$

By substituting this expression for $e_R$ in Equation 3 and simplifying terms, then $$E_R - \frac{1}{CR\alpha} E_R = E_0 \qquad (5)$$

or $$\frac{E_R}{E_0} = \frac{CR}{CR - \frac{1}{\alpha}} = \frac{CR}{CR - T} \qquad (6)$$

The ratio $$\frac{E_R}{E_0}$$

is equal to the ratio of the resistance of the corresponding leg of the potentiometer 14 to the overall resistance. Thus to calibrate the potentiometer for a particular RC value of the differentiating network, any value of T can be chosen, this value substituted in Equation 6 with the RC value, and the corresponding position of the potentiometer set by suitable means, such as an ohmmeter or bridge, so that the ratio of resistances is equal to this value as expressed by Equation 6. For best results, the RC time constant of the differentiating network should be of the order of $\frac{1}{20}$ to $\frac{1}{2}$ of the time constant of the system to be measured, otherwise the scale becomes too compressed at one end or too insensitive at the other end of the scale. If time constants outside this range are to be measured the RC product should be changed.

From the above description it will be recognized that the objects of the invention have been achieved by the provision of a direct reading time constant meter. The meter is suitable for measuring the time constant of any relatively high Q oscillating system by use of appropriate voltage generating means driven by the system. Low Q systems can be measured by using various tricks for taking a rapid reading, such as a persistent-screen oscilloscope or recording oscillograph. The meter is essentially a high impedance device and so need not introduce additional damping in the system measured. The meter is easy to use, accurate, fast and yet not complicated in design.

While the invention has been described as measuring an exponentially decaying alternating voltage signal, measurement of a unidirectional decaying signal, such as would be encountered in the determination of leakage in an electrolytic condenser for example, is possible by eliminating the rectifier and filter portions of the circuit and applying the unidirectionally decaying voltage directly across the attenuator 14.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for measuring the time constant of an exponentially decaying alternating signal, the apparatus comprising a full wave rectifier having an input circuit adapted to receive said alternating signal, a resistance-capacitance differentiating network, a filter network connected between the output of the rectifier and the differentiating network, a calibrated potentiometer across the output of the filter network, a tuning eye having a control electrode, and a voltage divider connecting the output of the potentiometer and the differentiating network, the control electrode of the tuning eye being connected to the midpoint of the voltage divider whereby a continuous balance is indicated between the output of the differentiating network and the output of the potentiometer as the transient signal decays.

2. Apparatus for measuring the time constant of an exponentially decaying alternating signal, the apparatus comprising a rectifier having an input circuit adapted to receive said alternating signal, a differentiating network, a filter network connected between the output of the rectifier and the differentiating network, a calibrated potentiometer across the output of the filter network, a tuning eye having a control electrode, and a voltage divider connecting the output of the potentiometer and the differentiating network, the control electrode of the tuning eye being connected to the midpoint of the voltage divider whereby a continuous balance is indicated between the output of the differentiating network and the output of the potentiometer as the transient signal decays.

3. Apparatus for measuring the time constant of an exponentially decaying alternating signal, the apparatus comprising a rectifier having an input circuit adapted to receive said alternating signal, a differentiating network, a filter network connected between the output of the rectifier and the differentiating network, a calibrated potentiometer across the output of the filter network, null balance indicating means, and a voltage divider connecting the output of the potentiometer and the differentiating network, the indicating means being connected to the midpoint of the voltage divider whereby a continuous balance is indicated between the output of the differentiating network and the output of the potentiometer as the transient signal decays.

4. Apparatus for measuring the time constant of an exponentially decaying alternating signal, the apparatus comprising a rectifier, a differentiating network, a filter network connected between the output of the rectifier and the differentiating network, a calibrated potentiometer across the output of the filter network, a tuning eye having a control electrode, and means for connecting the output of the potentiometer and the differentiating network to the control electrode of the tuning eye whereby a continuous balance is indicated between the output of the differentiating network and the output of the potentiometer as the transient signal decays.

5. Apparatus for measuring the time constant of an exponentially decaying alternating signal, the apparatus comprising a rectifier, a differentiating network, a filter network connected between the output of the rectifier and the differentiating network, a calibrated potentiometer across the output of the filter network, a null balance indicator, and a voltage divider connecting the output of the potentiometer and the differentiating network, the null balance indicator being connected to the midpoint of the voltage divider whereby a continuous balance is indicated between the output of the differentiating network and the output of the potentiometer as the transient signal decays.

6. Apparatus for measuring the time constant of a transient exponentially decaying alternating signal, said apparatus comprising means for rectifying the signal, means for filtering the output of the rectifying means, means for differentiating the output signal of said filtering means, a calibrated attenuator connected across the output of said filtering means, means for adding the differentiated signal with the attenuated signal, and null balance indicating means responsive to the output of said signal adding means for indicating a continuous balance between the output signal of the differentiating means and the attenuating means.

7. Apparatus for measuring the time constant of a transient exponentially decaying alternating signal, said apparatus comprising means for rectifying the signal, means for filtering the output of the rectifying means, means for differentiating the output signal of said filtering means, a calibrated attenuator connected across the output of said filtering means, and null balance indicating means connected between the output of the attenuator and the output of the differentiating means for indicating a continuous balance between the output signals of the differentiating means and the attenuating means.

8. Apparatus for measuring the time constant of an exponentially decaying voltage signal including a differentiating network, an attenuator connected in parallel with the differentiating network, said voltage signal being simultaneously applied to the differentiating network and the attenuator, and a null balance indicator connected across the output of said attenuator and the output of said differentiating network for indicating a continuous balance between the attenuated and differentiated signals.

9. Apparatus for measuring the time constant of an exponentially decaying voltage signal including a means for differentiating said voltage signal, means for adjustably attenuating said voltage signal, said differentiating means and said attenuating means being connected in parallel whereby said voltage signal can be simultaneously applied to the differentiating means and attenuating means, and a null balance indicator connected across the output of said attenuating means and the output of said differentiating means for indicating with proper adjustment of the attenuating means a continuous balance between the attenuated and differentiated signals.

References Cited in the file of this patent

UNITED STATES PATENTS

| | | |
|---|---|---|
| 2,008,857 | Flanders | July 23, 1935 |
| 2,111,235 | Avins | Mar. 15, 1938 |
| 2,415,855 | Skellett | Feb. 18, 1847 |
| 2,576,257 | Lange | Nov. 27, 1951 |
| 2,629,053 | De Boisblanc | Feb. 17, 1953 |